No. 848,935. PATENTED APR. 2, 1907.
M. O. TROY.
SYSTEM OF ELECTRICAL DISTRIBUTION.
APPLICATION FILED JULY 19, 1902.
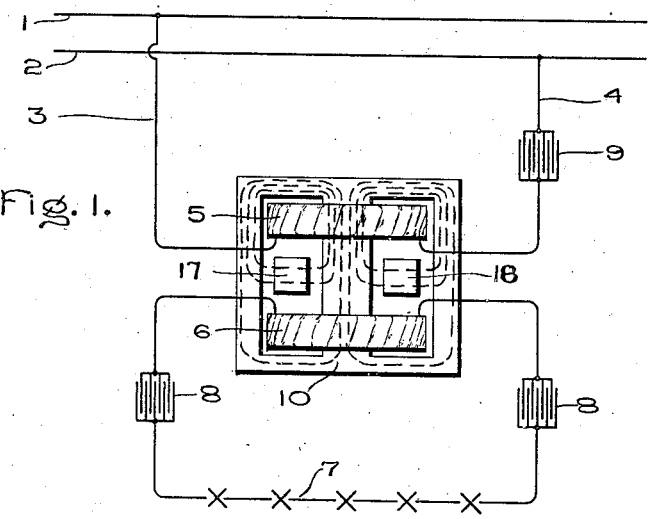
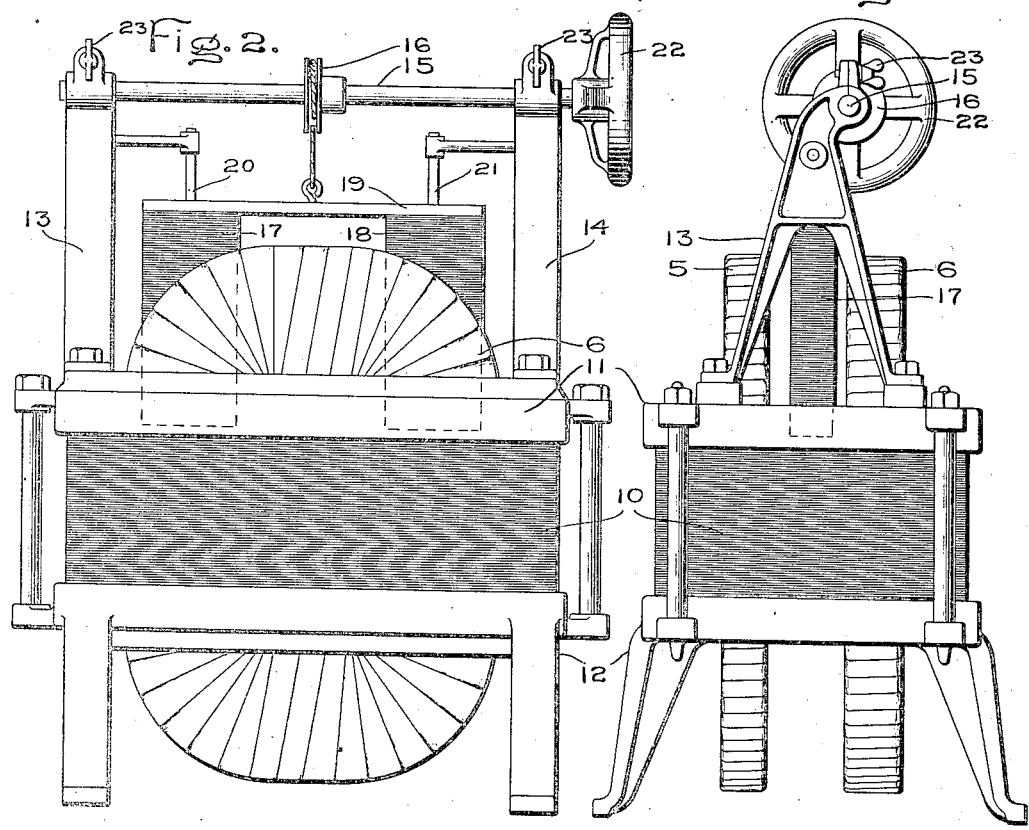
Witnesses:
G. A. Thornton
Helen Orford
Inventor:
Matthew O. Troy,
by Albert G. Davis,
Atty.

UNITED STATES PATENT OFFICE.

MATTHEW O. TROY, OF LYNN, MASSACHUSETTS, ASSIGNOR TO GENERAL ELECTRIC COMPANY, A CORPORATION OF NEW YORK.

SYSTEM OF ELECTRICAL DISTRIBUTION.

No. 848,935.     Specification of Letters Patent.     Patented April 2, 1907.

Application filed July 19, 1902. Serial No. 116,208.

*To all whom it may concern:*

Be it known that I, MATTHEW O. TROY, a citizen of the United States, residing at Lynn, in the county of Essex, State of Massachusetts, have invented certain new and useful Improvements in Systems of Electrical Distribution, of which the following is a specification.

My present invention relates to a system in which a circuit containing a series of translating devices—such, for example, as arc-lamps—is supplied with energy derived from a source of current of constant potential, and comprises certain improvements whereby a constant current may be maintained in the circuit supplying the arc-lamps or other translating devices.

In carrying my invention into practice I provide means for preventing the regulation of the system from being affected by harmonics in the current-wave and also for compensating for the objectionable effect upon the regulation of the system due to changes in the voltage of the constant-potential supply.

The novel features which I believe characterize my invention I have pointed out with particularity in the appended claims, the invention itself, as illustrated by one of the various embodiments of which it is capable, being described in detail in the following specification, which is to be taken in connection with the accompanying drawings, in which—

Figure 1 is a diagrammatic representation of a system embodying my invention, and Figs. 2 and 3 views of a transformer of variable reactance for use in connection with such a system.

The circuit to be regulated, which is a series circuit, is intended to supply arc-lamps or other translating devices possessing inductance. To secure a constant-current regulation in such a circuit when connected across a source of supply of substantially constant potential, I include in the circuit a device possessing capacity—such, for example, as a condenser or condensers, polarization-cells, or the primary of a transformer the secondary of which is closed upon a condenser or other device possessing capacity. The amount of the capacity reactance thus employed is proportioned so that when there is no load on the circuit, or substantially no load, the total impedance is sufficient to cause current of the desired value to flow in the constant-current circuit. When lamps or other translating devices are cut into the circuit, their inductance neutralizes a corresponding portion of the capacity of the condenser or other device or devices possessing capacity. The total impedance of the circuit, therefore, does not change appreciably, so that the current remains practically constant regardless of the load. I find, however, if special precautions are not taken to prevent it, that the regulation of the system may be seriously affected through the magnifying action of the condenser or other device possessing capacity upon such harmonics of minor character as may exist in the current-wave. In application, Serial No. 86,473, filed by me on or about December 19, 1901, I proposed to obviate this objectionable action by connecting in series with a condenser a device possessing inductance and to increase the capacity of the condenser sufficiently to balance the effect of the inductance. The presence of the inductance in the circuit operates to suppress harmonics in the current-wave, thereby preventing them from being magnified by the condenser and the regulation of the system thus impaired. I have found that where a transformer is used for feeding the constant-current system I may omit the inductance in series with the constant-current circuit and make use of the inductance of the transformer in place thereof. To this end I design the transformer so as to have a relatively large amount of inductive reactance, and, in addition, I make the transformer of such a construction that this reactance may be varied either manually or automatically, as desired. By varying the reactance I may compensate for variations of voltage of the supply-station, such as takes place when the load on the station greatly changes.

A system such as I have described briefly is indicated in Fig. 1, in which the source of constant-potential current is represented by the mains 1 2. Leads 3 4 extend therefrom and supply current to the primary 5 of a variable-reactance transformer constructed in accordance with my invention. The secondary 6 of this transformer supplies current to the series circuit containing arc-lamps or other inductive translating devices 7. In series with the arc-lamp circuit are connected condensers 8 or other devices possessing capacity. These condensers assist in securing the regulating action of the constant-current circuit in the manner above described.

The transformer supplying the arc-lamp circuit is constructed so that considerable leakage may exist between the primary and secondary coils, whereby the inductance of the transformer becomes considerable and operates to damp out any harmonics which may tend to flow in either its primary or secondary circuits. To prevent the lowering of the power factor of the system, which would otherwise result from the presence of the inductance of the transformer, I connect in circuit a device or devices possessing capacity sufficient to neutralize this inductance. In the present instance I make use of a condenser 9, connected in series with the primary of the transformer, though it might, if desired, be connected in series with the secondary circuit. The inductance of the transformer, therefore, has practically no effect upon the power factor of the system, but operates, nevertheless, to damp out any harmonics which may tend to exist in the current-wave, and thereby prevents the regulation of the system from being impaired thereby.

In order to vary the reluctance of the transformer for the purpose either of initial adjustment or for compensating for variations in the voltage of the source of supply, I have devised a construction in which the reluctance between the primary and secondary coils may be varied by inserting or withdrawing a mass of magnetic material which by varying the degree of its insertion or withdrawal operates as a variable shunt for the lines of force produced by the primary winding.

The mechanical construction employed is indicated with some degree of detail in Figs. 2 and 3. The core of the transformer, which is of the shell type, having a central member upon which the coils are mounted, as indicated in Fig. 1, is shown in side elevation in Figs. 2 and 3 at 10. The primary and secondary coils 5 6 are mounted upon this core, and the whole is supported by a framework consisting of upper and lower members 11 and 12, between which the core is clamped. The lower member 12 is provided with supporting-standards for holding the apparatus in an upright position. The upper member 11 is provided in its turn with standards 13 14, having bearings in their upper ends for a shaft 15, provided at its middle portion with a winding-wheel 16, over which passes a rope or cord from which is suspended two blocks 17 18, of laminated iron, connected together by a cross-bar 19. These blocks are adapted to be moved up or down between the primary and secondary coils of the transformer, thereby constituting a variable magnetic shunt for the flux interlinking the coils. These blocks run on guides 20 and 21 and are conveniently moved by means of the handwheel 22. When the parts have been adjusted to the position desired, they may be prevented from further movement by clamping the shaft 15 from rotation by means of the clamping-nut 23, provided for that purpose. The manner in which the magnetic shunt diverts lines of force and prevents them from traversing the secondary winding is conventionally indicated by the dotted lines in Fig. 1.

What I claim as new, and desire to secure by Letters Patent of the United States, is—

1. The combination of a series circuit containing translating devices possessing inductance, a device possessing capacity also in said circuit, and a transformer for supplying current to said circuit, said transformer possessing sufficient inductive reactance to filter out or suppress harmonics.

2. The combination of a transformer having a magnetic circuit of adjustable reluctance, a series circuit containing translating devices possessing inductance, and means in said circuit for maintaining a constant current therein.

3. The combination of a transformer of variable reactance, a series circuit containing translating devices fed thereby, and a device possessing the effect of capacity in series in said circuit.

4. The combination of a series circuit containing translating devices possessing inductance, a device possessing capacity in series in said circuit, and a source of current for supplying said circuit, said source possessing sufficient inductance to damp out harmonics in the wave of current in said circuit.

5. The combination of a transformer, means for varying the reluctance of the leakage-path between the primary and secondary of said transformer, means for supplying said transformer with current from a source of nominally-constant potential, a series circuit containing translating devices connected to the secondary of said transformer, a device possessing capacity in series in said circuit for securing a substantially constant current regulation in said circuit, and additional means for compensating for the effect of the inductance of the transformer upon the system.

6. A regulable stationary induction apparatus consisting of a closed core, coils spaced apart on said core, a flux-shunt of magnetic material movable into and out of the space between said coils, and means for holding said flux-shunt in any chosen position within its range of movement.

7. A regulable stationary induction apparatus consisting of a closed core, coils mounted on said core so as to provide a leakage-space for magnetic flux, a flux-shunt of magnetic material, a device for raising and lowering said flux-shunt in said leakage-space, and means for holding said flux-shunt in any chosen position within its range of movement.

8. Means for improving the power factor of an alternateing-current circuit consisting of a condenser, and a device possessing inductance in circuit with said condenser and operating to screen out harmonics.

9. A regulable stationary induction apparatus consisting of a closed magnetic core, coils mounted on said core so as to provide between them a leakage-space for magnetic flux, a flux-shunt of magnetic material, movable into and out of said leakage-space, and a hand-wheel for raising and lowering said flux-shunt.

In witness whereof I have hereunto set my hand this 16th day of July, 1902.

MATTHEW O. TROY.

Witnesses:
    ALEX. F. MACDONALD,
    BENJAMIN B. HULL.